United States Patent
Wei

(10) Patent No.: US 9,548,624 B2
(45) Date of Patent: Jan. 17, 2017

(54) WIRELESS CHARGER AND CHARGING METHOD USING SAME

(71) Applicant: Chiun Mai Communication Systems, Inc., New Taipei (TW)

(72) Inventor: Po-Sun Wei, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 309 days.

(21) Appl. No.: 14/481,599

(22) Filed: Sep. 9, 2014

(65) Prior Publication Data
US 2015/0130408 A1   May 14, 2015

(30) Foreign Application Priority Data
Nov. 13, 2013  (CN) .................... 2013 1 05658164

(51) Int. Cl.
*H02J 7/00*  (2006.01)
*H02J 7/02*  (2016.01)

(52) U.S. Cl.
CPC ............ *H02J 7/025* (2013.01); *H02J 7/0047* (2013.01); *H02J 7/0077* (2013.01); *H02J 2007/0001* (2013.01); *H02J 2007/0096* (2013.01); *Y02B 40/90* (2013.01)

(58) Field of Classification Search
USPC ........................ 320/108, 128, 137
See application file for complete search history.

(56) References Cited

U.S. PATENT DOCUMENTS

| | | | | |
|---|---|---|---|---|
| 7,948,208 B2* | 5/2011 | Partovi | ................ | H02J 7/0027 320/108 |
| 8,965,523 B2* | 2/2015 | Forsell | .................... | H02J 7/025 607/60 |
| 9,419,478 B2* | 8/2016 | Jung | ....................... | H02J 50/80 |
| 9,423,439 B2* | 8/2016 | Jung | ................ | G01R 29/0814 |
| 2013/0200844 A1* | 8/2013 | Lee | ....................... | H02J 7/0042 320/108 |
| 2014/0152246 A1* | 6/2014 | Forsell | .................... | A61N 1/08 320/108 |
| 2014/0159652 A1* | 6/2014 | Hall | ....................... | H02J 5/005 320/108 |

\* cited by examiner

*Primary Examiner* — Richard V Muralidar
(74) *Attorney, Agent, or Firm* — Zhigang Ma

(57) ABSTRACT

A charger for wirelessly charging an electronic device by electromagnetic induction includes a coil assembly and a control unit. The control unit includes an identification module, a detection module, a comparing module, and an allocating module. The identification module identifies the electronic device. The detection module detects power rating and required electric power of the electronic device. The comparing module compares residual electric power of the wireless charger with the required electric power of the electronic device. The allocating module selects a portion of the residual electric power of the wireless charger. The coil assembly converts the portion of the residual electric power of the wireless charger into electromagnetic waves, and directs the electromagnetic waves to the electronic device.

13 Claims, 2 Drawing Sheets

WIRELESS CHARGER AND CHARGING METHOD USING SAME

FIELD

The subject matter herein generally relates to electromagnetic induction.

BACKGROUND

Most wireless chargers, such as mobile phones and tablet computers, may support wireless charging technologies. When power of an electronic device is exhausted, a user can use a wireless charger to recharge the electronic device via electromagnetic induction.

BRIEF DESCRIPTION OF THE DRAWINGS

Implementations of the present technology will now be described, by way of example only, with reference to the attached figures.

DETAILED DESCRIPTION

Figure 1:
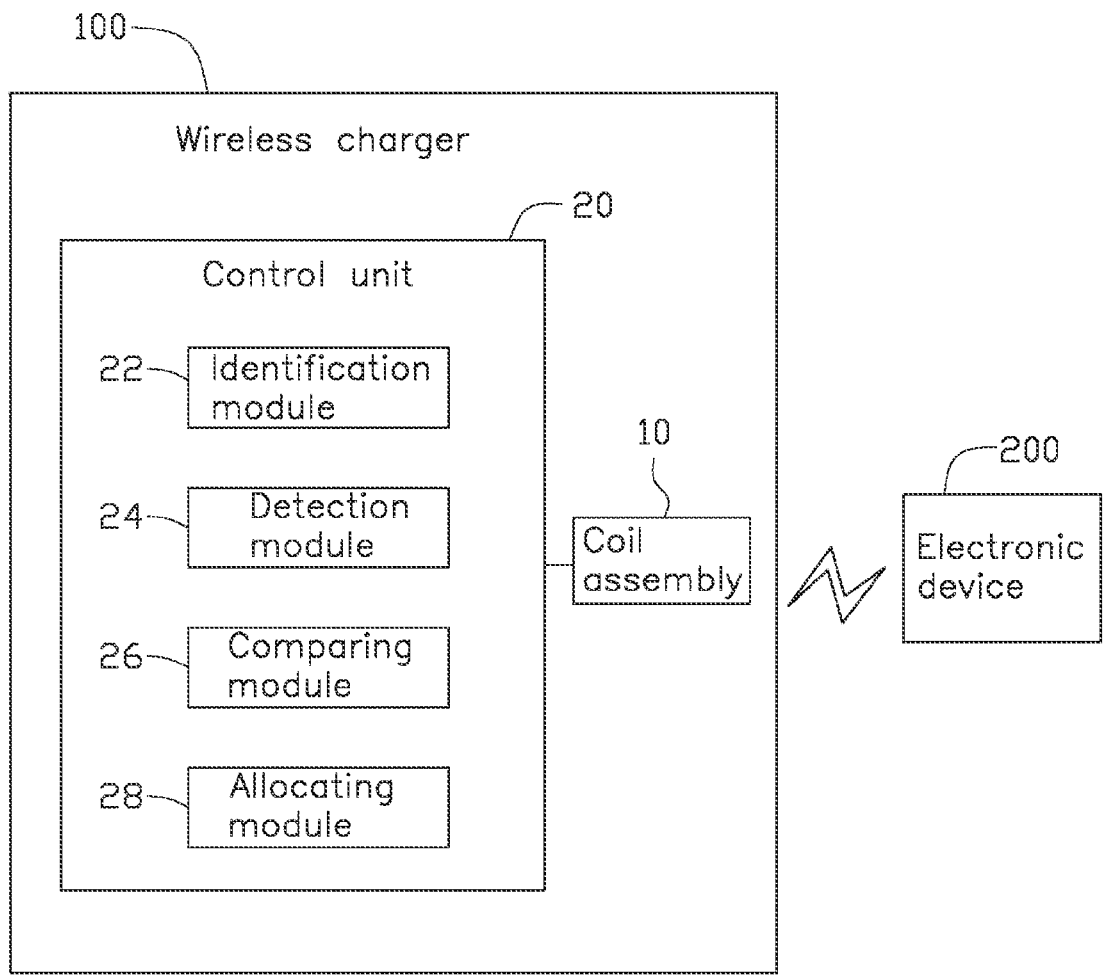
FIG. 1 is a block diagram of one embodiment of a wireless charger.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

In the present disclosure, "module," refers to logic embodied in hardware or firmware, or to a collection of software instructions, written in a program language. In one embodiment, the program language can be Java, C, or assembly. One or more software instructions in the modules can be embedded in firmware, such as in an EPROM. The modules described herein can be implemented as either software and/or hardware modules and can be stored in any type of non-transitory computer-readable media or storage medium. Non-limiting examples of a non-transitory computer-readable medium include CDs, DVDs, flash memory, and hard disk drives.

The present disclosure is described in relation to a wireless charger and method for charging the wireless charger using wireless charging technologies.

FIG. 1 is a block diagram of one embodiment of a wireless charger 100. In one embodiment, the wireless charger 100 can be a mobile phone, a tablet computer, a notebook computer, or other device.

The wireless charger 100 is configured to charge an electronic device 200 employing wireless charging technologies. In at least one embodiment, the electronic device 200 including software and hardware can be the same as the wireless charger 100. In other embodiments, the electronic device 200 only includes the software and hardware which can support wireless charging technologies.

The wireless charger 100 includes a coil assembly 10 and a control unit 20 coupled to the coil assembly 10. The control unit 20 includes an identification module 22, a detection module 24, a comparing module 26, and an allocating module 28.

The coil assembly 10 converts electric power into electromagnetic waves, and the electromagnetic waves are directed to the electronic device 200. In at least one embodiment, the coil assembly 10 converts electric power of a battery of the wireless charger 100 into electromagnetic waves. Additionally, the coil assembly 10 transmits control signals output from the control unit 20 to the electronic device 200 via electromagnetic induction, and receives feedback signals from the electronic device 200. In at least one embodiment, the coil assembly 10 can be a radio frequency (RF) antenna integrating at least one an integrated circuit (IC), such as a current conversion circuit.

The identification module 22 identifies the electronic device 200. In at least one embodiment, the identification module 22 sends an acknowledgement (ACK) command to the electronic device 200, for obtaining an identification (ID) number of the electronic device 200. The ID number can include hardware address, type, and other verifying codes of the electronic device 200. Thus, the identification module 22 can identify the electronic device 200 according to the ID number, thereby establishing communication between the wireless charger 100 and the electronic device 200.

The detection module 24 detects power rating and residual electric power of the electronic device 200, and then calculates required electric power of the electronic device 200 according to the power rating and the residual electric power. For example, the power rating of the electronic device 200 is about 1700 mAh, and the residual electric power of the electronic device 200 is about 500 mAh. Then, the detection module 24 calculates the required electric power of the electronic device 200 is about 1200 mAh.

The comparing module 26 determines whether or not residual electric power of the wireless charger 100 is greater than the required electric power of the electronic device 200, and then controls the allocating module 28 according to the determination of the residual electric power of the wireless charger 100 and the required electric power of the electronic device 200. For example, if the residual electric power of the wireless charger 100 is greater than the required electric power of the electronic device 200, the comparing module 26 sends a first control command to the allocating module 28. If the residual electric power of the wireless charger 100 is equal to or less than the required electric power of the electronic device 200, the comparing module 26 sends a second control command to the allocating module 28.

The allocating module 28 allocates the residual electric power of the wireless charger 100 for the electronic device 200 according to the first control command or the second control command. When the first control command is received, the allocating module 28 selects a first proportion of the residual electric power of the wireless charger 100 for charging the electronic device 200. In at least one embodiment, the first proportion of the residual electric power of the wireless charger 100 can be equal to the required electric power of the electronic device 200. When the second control command is received, the allocating module 28 determines whether or not to continue to charge the electronic device 200 using the wireless charger 100. In at least one embodiment, the allocating module 28 can display two popup windows including a message of "charge the electronic device?" on the a display screen of the wireless charger 100, and offer two choices "yes" or "no". If the choice "no" is selected, the allocating module 28 determines that the wireless charger 100 will not charge the electronic device 200. If the choice "yes" is selected, the allocating module 28 selects a second proportion of the residual electric power of the wireless charger 100 to charge the electronic device 200, and a range of the second proportion of can be, for example, about 20%-50%.

Figure 2:
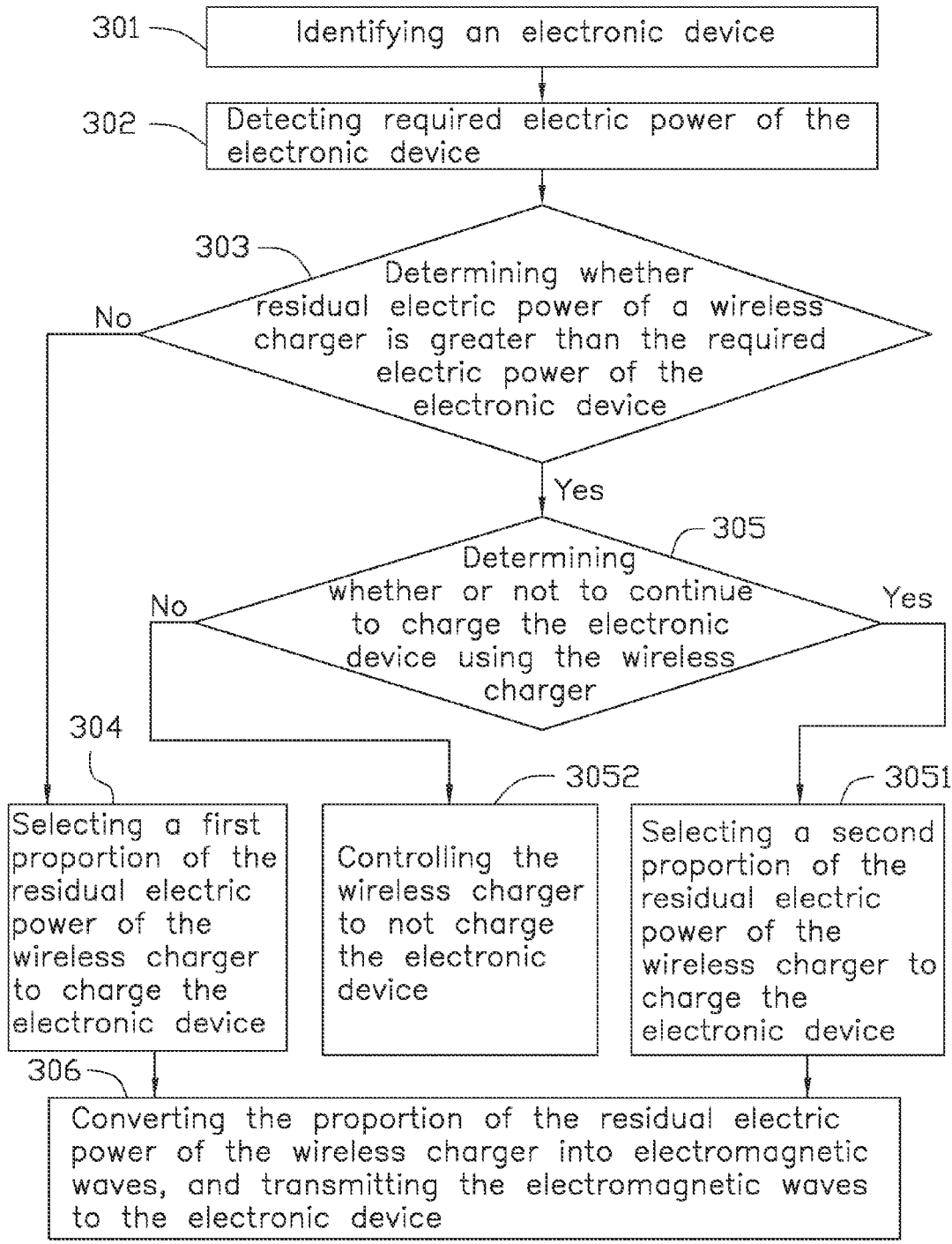
FIG. 2 is a flowchart of one embodiment of a method for charging an electronic device using the wireless charger of FIG. 1.

Referring to FIG. 2, a flowchart is presented in accordance with an example embodiment which is being thus illustrated. The example method 300 is provided by way of example, as there are a variety of ways to carry out the method. The method 300 described below can be carried out using the configurations illustrated in FIG. 1, for example, and various elements of these figures are referenced in explaining an example method 300. Each block shown in FIG. 2 represents one or more processes, methods or subroutines, carried out in the example method 300. Additionally, the illustrated order of blocks is by example only and the order of the blocks can change. The example method 300 can begin at block 301.

At block 301, the wireless charger 100 is moved to be sufficiently close to the electronic device 200 to communicate with the electronic device 200. The identification module 22 sends the ACK command to the electronic device 200, and obtains the ID number of the electronic device 200. Then, the wireless charger 100 communicates with the electronic device 200 via the coil assembly 100.

At block 302, the detection module 24 detects the power rating and the residual electric power of the electronic device 200 and calculates the required electric power of the electronic device 200.

At block 303, the comparing module 26 determines whether or not the residual electric power of the wireless charger 100 is greater than the required electric power of the electronic device 200. If the residual electric power of the wireless charger 100 is greater than the required electric power of the electronic device 200, the comparing module 26 sends a first control command to the allocating module 28, and block 304 is implemented. If the residual electric power of the wireless charger 100 is equal to or less than the required electric power of the electronic device 200, the comparing module 26 sends a second control command to the allocating module 28, and block 305 is implemented.

At block 304, the allocating module 28 selects a first proportion of the residual electric power of the wireless charger 100 for charging the electronic device 200. Thus, the electronic device 200 can be fully charged.

At block 305, the allocating module 28 determines whether or not to continue to charge the electronic device 200 using the wireless charger 100. If the choice "yes" is selected, block 3051 is implemented. If the choice "no" is selected, block 3052 is implemented.

At block 3051, the allocating module 28 selects a second proportion of the residual electric power of the wireless charger 100 to charge the electronic device 200.

At block 3052, the allocating module 28 controls the wireless charger 100 not to charge the electronic device 200.

At block 306, the coil assembly 10 converts a first proportion of the residual electric power of the wireless charger 100 or a second proportion of the residual electric power of the wireless charger 100 into electromagnetic waves, and directs the electromagnetic waves to the electronic device 200. Thus, the electronic device 200 can be charged via electromagnetic induction.

In summary, the detection module 24 detects the required electric power of the electronic device 200, and the comparing module 26 compares the residual electric power of the wireless charger 100 with the required electric power of the electronic device 200. Thus, the allocating module 28 selects a portion of the residual electric power of the wireless charger 100 for charging the electronic device 200. Since the charging process between the wireless charger 100 and the electronic device 200 is guided, the wireless charger 100 is both convenient and efficient.

The embodiments shown and described above are only examples. Many details are often found in the art such as the other features of a wireless charger. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A wireless charger for charging an electronic device using wireless charging technologies, the wireless charger comprising:
   a coil assembly; and
   a control unit coupled to the coil assembly, the control unit comprising:
      an identification module for identifying the electronic device;
      a detection module for detecting required electric power of the electronic device;
      a comparing module for determining whether residual electric power of the wireless charger is greater than the required electric power of the electronic device; and
      an allocating module directed by a determination of the comparing module, and for selecting a portion of the residual electric power of the wireless charger for charging the electronic device;

wherein the coil assembly converts the portion of the residual electric power of the wireless charger into electromagnetic waves, and directs the electromagnetic waves to the electronic device for charging the electronic device.

2. The wireless charger as claimed in claim 1, wherein the coil assembly transmits control signals output from the control unit to the electronic device via electromagnetic induction, and receives feedback signals from the electronic device.

3. The wireless charger as claimed in claim 2, wherein the identification module sends an acknowledgement (ACK) command to the electronic device, and obtains an identification (ID) number of the electronic device.

4. The wireless charger as claimed in claim 3, wherein the identification module identifies the electronic device according to the ID number.

5. The wireless charger as claimed in claim 1, wherein if the residual electric power of the wireless charger is greater than the required electric power of the electronic device, the comparing module sends a first control command to the allocating module, the allocating module selects a first proportion of the residual electric power of the wireless charger to charge the electronic device.

6. The wireless charger as claimed in claim 1, wherein if the residual electric power of the wireless charger is equal to or less than the required electric power of the electronic device, the allocating module determines that the wireless charger does not charge the electronic device, or selects a second proportion of the residual electric power of the wireless charger to charge the electronic device.

7. A method for charging an electronic device using a wireless charger, the method comprising:
    identifying the electronic device;
    detecting required electric power of the electronic device;
    determining whether residual electric power of the wireless charger is greater than the required electric power of the electronic device;
    selecting a portion of the residual electric power of the wireless charger;
    converting the portion of the residual electric power of the wireless charger into electromagnetic waves; and
    transmitting the electromagnetic waves to the electronic device for charging the electronic device via electromagnetic induction.

8. The method as claimed in claim 7, further comprising:
    transmitting control signals output from the wireless charger to the electronic device via electromagnetic induction; and
    receiving feedback signals from the electronic device.

9. The method as claimed in claim 8, further comprising:
    sending an acknowledgement (ACK) command to the electronic device; and
    obtaining an identification (ID) number of the electronic device.

10. The method as claimed in claim 9, further comprising identifying the electronic device according to the ID number.

11. The method as claimed in claim 7, further comprising selecting a first proportion of the residual electric power of the wireless charger to charge the electronic device if the residual electric power of the wireless charger is greater than the required electric power of the electronic device.

12. The method as claimed in claim 7, further comprising controlling the wireless charger to not charge the electronic device, or selecting a second proportion of the residual electric power of the wireless charger to charge the electronic device if the residual electric power of the wireless charger is equal to or less than the required electric power of the electronic device.

13. A wireless charger for wirelessly charging a rechargeable electronic device, the wireless charger comprising:
    a coil assembly; and
    a control unit coupled to the coil assembly, the control unit comprising:
        an identification module for identifying a wirelessly rechargeable electronic device;
        a detection unit for detecting required electric power of the identified rechargeable device;
        a comparing module for determining whether residual electric power of the wireless charger is greater than required electric power of the identified rechargeable device so and
        an allocating module for selectively allocating a portion of the residual electric power of the wireless charger for charging the rechargeable electronic device;
    wherein, if the comparing module determines that the residual electric power of the wireless charger is greater than the required power of the electronic device, the comparing module sends a first control command to the allocating module directing the allocating module to select a first proportion of the residual power for charging the rechargeable electronic device, and activates the coil assembly which converts the first portion of residual electric power of the wireless charger into electromagnetic waves directing the electromagnetic waves to the rechargeable electronic device for charging; and
    wherein, if the comparing module determines that the residual electric power of the wireless charger is equal to or less than the required electric power of the electronic device, the comparing module sends a second control command to the allocating module, the second control command directs the allocating module to select a second proportion of the residual power of the wireless charger for charging the rechargeable electronic device and activate the coil assembly which converts the first portion of residual electric power of the wireless charger into electromagnetic waves and directs the electromagnetic waves to the rechargeable electronic device for charging; or not to activate the coil assembly.

* * * * *